Oct. 28, 1952     S. McCLENEGHAN, JR     2,615,291
INVERTIBLE ROLLING HARROW
Filed Nov. 16, 1949     2 SHEETS—SHEET 1
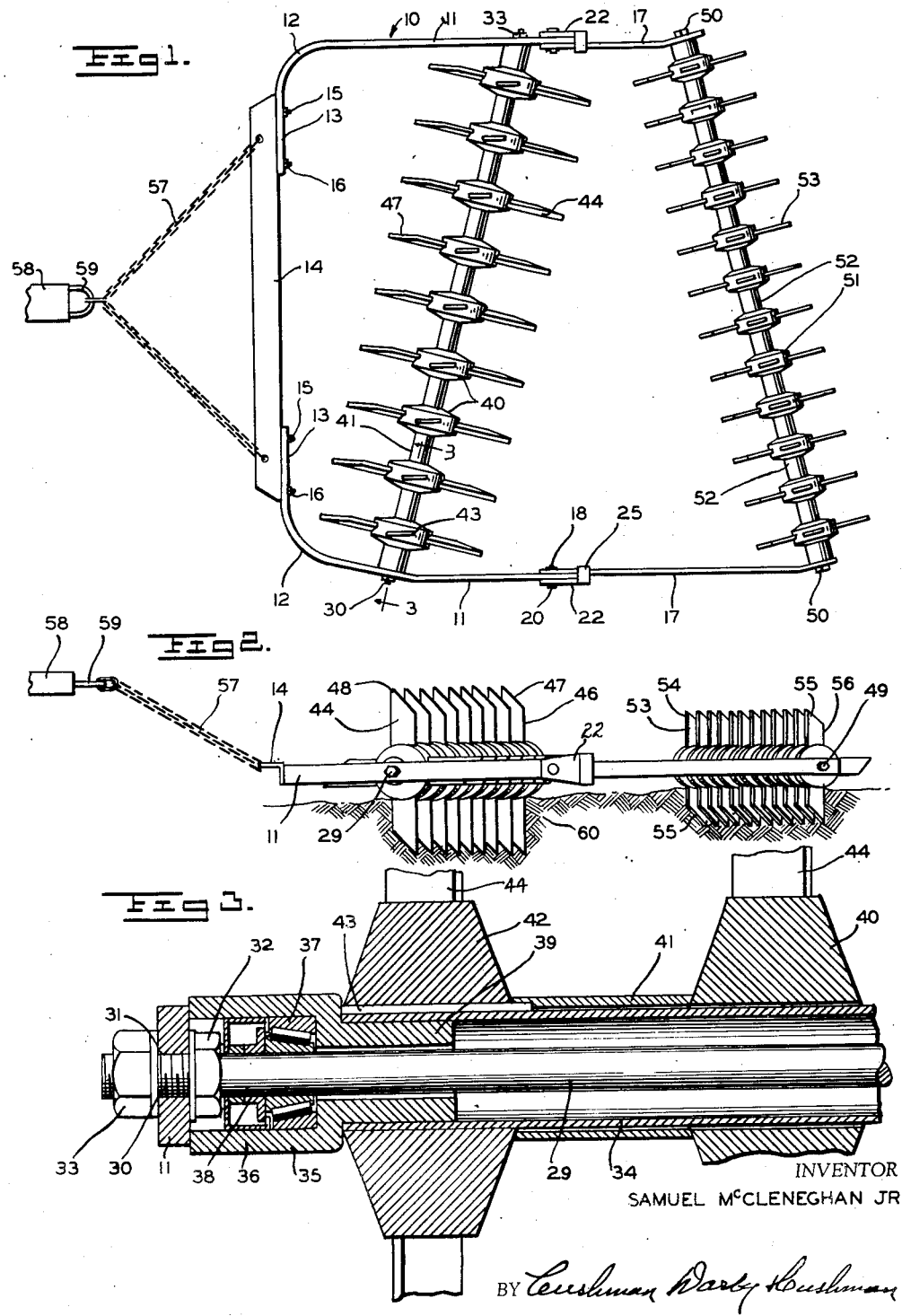
INVENTOR
SAMUEL McCLENEGHAN JR.
BY *Cushman Darby Cushman*
ATTORNEY

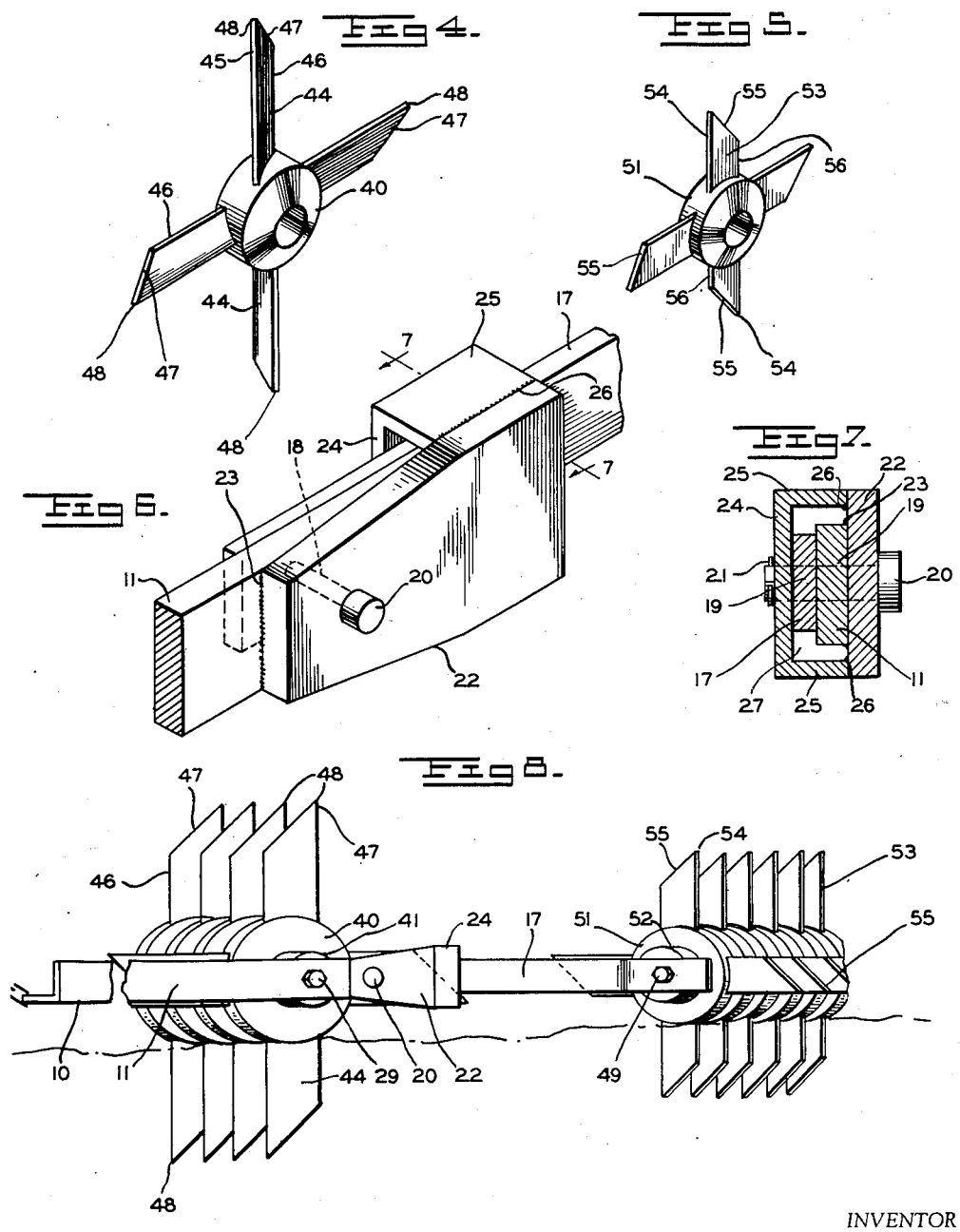

Patented Oct. 28, 1952

2,615,291

UNITED STATES PATENT OFFICE 2,615,291

INVERTIBLE ROLLING HARROW

Samuel McCleneghan, Jr., Valley, Nebr., assignor to Valley Manufacturing Company, Valley, Nebr., a corporation of Nebraska Application November 16, 1949, Serial No. 127,542

6 Claims. (Cl. 55—11)

The present invention relates to agricultural implements and, more particularly, to a new and improved rotary harrow arranged to be attached to a plow or the like.

An important object consists in providing a harrow with spaced rotary blades so disposed as to prepare the soil for planting by pulverizing and compacting the earth into a smooth surfaced and homogeneous seed bed, and in which the parts of the harrow are constructed and arranged to enable the saving of labor by means for efficiently discing, harrowing, and compacting the earth simultaneously with the plowing operation.

A further object comprehends the provision of a harrow frame having a front section and a rear section hinged to the front section so that the sections are free to follow the surface of the soil over which they are moved. Transversely mounted on the front and rear sections are inclined shafts having spaced hubs provided with radially and outwardly extending circumferentially spaced blades. The hubs and blades on the front shaft are of larger diameter and size, and spaced wider apart than the hubs and blades on the rear shaft so that the earth is initially broken up by the large blades to reduce the large portions of plowed soil without clogging, and then the earth is pulverized and reduced by the smaller blades so as to insure proper treatment of the soil. The blades on the hubs of the front shaft are preferably inclined or disposed at an angle relative to the axis of the hub so as to move in a spiral path through the soil, while the smaller blades on the hubs of the rear shaft are perpendicular to the axis of the rear hubs.

A further object is to provide an invertible or reversible harrow having transversely spaced inclined rows of blades, each of which blades is formed with a leading edge or side longer than its trailing or rear edge, and which is connected at its outer end to the rear edge by an inclined or bevelled edge provided with a pointed end at the juncture of the inclined side with the front side so that when the blades are positioned to cause the leading pointed end thereof to initially strike the soil, it will impart a wedging and tearing action and then a packing and compacting action. This action of the blades may be changed by inverting or turning the harrow frame over so that the tapered edges of the blades will now strike or engage the soil flatly and then penetrate, turn and break up the soil during the spiral path of the blades through the soil, and thus increase the soil packing simultaneously with the pulverizing action imparted to the soil.

Other objects and advantages of the invention will become apparent from the following description when taken in conjunction with the accompanying claims and drawings.

Referring to the drawings in which is shown a preferred embodiment of the invention:

Figure 1 is a plan view of a reversible harrow constructed in accordance with the invention.

Figure 2 is a longitudinal sectional view of Figure 1.

Figure 3 is an enlarged sectional view taken substantially along the line 3—3 of Figure 1.

Figure 4 is a detail perspective view of one of the hubs and its associated blades carried by the inclined shaft on the front section of the frame.

Figure 5 is a detail sectional view of one of the hubs and its blades carried by the shaft on the rear section of the frame.

Figure 6 is a detail perspective view of the hinged connection of the frame sections.

Figure 7 is a sectional view taken substantially along the line 7—7 of Figure 6, and Figure 8 is a side elevational view similar to Figure 2 but showing the harrow frame and its associated parts inverted.

Referring to the drawings, 10 generally designates an invertible or reversible harrow frame that is preferably formed with side bars 11 bent as at 12 (Fig. 1) to provide the inwardly spaced outer end portions 13 to which may be connected the draft bar 14 by any suitable fastening means such as the threaded bolts 15 and the nuts 16. The side bars 11 and the draft bar 14 constitute a front section of the frame to which is pivotally connected the side bars 17 of a rear section by the bolts or pins 18 which extend through aligned transverse openings 19 (Fig. 7) formed in the overlapping end portions of the side bars 11 and 17, respectively. Each of the bolts 18 preferably has an enlarged head 20 at one end and its opposite end provided with a transverse aperture for receiving a cotter pin or the like 21. In order to limit the vertical swinging movement of the rear section of the frame relative to the front section thereof, a stop sleeve or member 22 is welded to each of the outer surfaces of the front sides 11 as at 23, and has extending laterally from one side thereof a substantially U-shaped portion 24 (Fig. 7) provided with spaced longitudinal stop arms 25 welded as at 26 to the adjacent side of the member 22 to provide a space or chamber 27 into which loosely extends the outer end of a side bar 17 which is pivotally connected to the front bar 11 by the transverse bolt 18 (Fig. 6).

Thus, it will be seen that as the side bars 17 swing about their pivots 18, their upward and downward movement will be limited by engagement with the adjacent inner walls of the opposed stop arms 25.

Extending transversely between the front section of the frame is a horizontally disposed fixed shaft 29 (Fig. 3) extending diagonally with respect to the horizontal transverse axis of the hinged sections and which has threaded end portions 30 extending through aligned transverse openings 31 in the front side bars 11 and to which are connected the locking nuts 32 and the retaining nuts 33. Rotatably mounted on the shaft 29 is a bearing tubing or sleeve 34 which preferably is formed at each end with a tubular housing 35 that has an enlarged hollow portion 36 in which are mounted the ball bearings 37 and the removable retaining members 38. The housing 35 also has a reduced inwardly extending tubular portion 39 that may be welded or otherwise suitably connected to the adjacent inner wall of the tubing 34 so that the latter is rotatably supported by the ball bearings 37 on the shaft 29 when the parts are assembled.

Rotatably mounted on the tubing 34 are a series or plurality of hubs 40 which are spaced from each other by the sleeves 41 and which preferably have at least one of the hubs, such as the hub 42 (Fig. 3), keyed as at 43 to the tubing 34 so as to be non-rotatably connected thereto, while the remaining hubs are rotatably and independently mounted on the tubing. Each of the hubs 40 (Fig. 4) has extending laterally and outwardly therefrom the circumferentially spaced blades 44 that are inclined or angularly disposed relative to the transverse axis of the hub. Each of the blades 44 preferably has a leading edge or side 45 (Fig. 4) longer in length than its trailing or rear edge 46 and is connected at its outer end to the rear side thereof by an inclined or tapered, straight, flat edge 47 which forms a pointed end 48 with the juncture of the front edge 45. Thus, it will be seen that the front and rear sides are shaped and connected to agitate and compact the soil and also to force under old vegetable matter so as to form a humus for enriching the soil.

A transverse shaft 49 disposed diagonally with respect to the horizontal transverse axis of the hinged sections and is connected to the rear side bars 17 (Fig. 2) and has threaded ends which extend through aligned openings in the side bars 17 and are secured thereto by the bolts 50. The shaft 49 rotatably carries a bearing tube or sleeve similar to the tubing 34, previously described, and on which is rotatably mounted the uniformly spaced transverse hubs 51 that are maintained in proper spaced position relative to each other by the sleeves or thimbles 52. To each of the hubs 51 are connected radially and outwardly extending blades 53 which are disposed substantially at right angles or perpendicular to the axis of the hub (Fig. 5). Each of the blades 53 has a leading or front edge 54 which is connected by a tapered or inclined side 55 to the rear edge 56. The hubs 54 and their associated blades or spiders are smaller than the forward hubs 40 and the inclined blades 44, and are spaced closer to each other. One of the hubs 40 may be keyed to its associated bearing tubing in a manner similar to the connection of the hub 42 previously described, while the other hubs 40 on the rear shaft 49 are rotatably mounted thereon. The frame 10 having the angular offset or inclined harrows may be connected by the draft bar 14 and the drawing chains 57 to a plow beam 58 or the like, as at 59.

The front and rear sections of the frame are independently suspended in a vertical plane by the bolts or pivots 18 so that the sections may freely move over the surface of the soil during the operation of the harrow and thus provide a flexible double hinged frame assembly which allows independent movement of the front and rear sections in a vertical plane so as to insure efficient operation of the pulverizing and compacting blades. As the hubs and blades on the front shaft are of larger diameter and spaced wider than the hubs and blades on the rear shaft, it will be seen that the inclined front blades will have a spiral path as they move through the soil so as to initially break up and reduce the large portions of the soil without clogging the same. At the same time, the smaller blades on the rear frame section tend to further pulverize or reduce the size of the earth particles and then impart a packing action so as to properly prepare the soil prior to seed planting or the like.

In operation, assuming the harrow frame and its associated parts are in the position as shown in Figures 1 and 2, it will be seen that as the harrow is drawn along the ground by the plow, rotation is imparted to the front and rear hubs 40 and 51 so that the blades are moved in the direction of the arrows, as shown in Figure 2. As the tapered pointed portions 48 of the front blades 44 engage the soil 60, they cause a wedging and tearing action to be imparted to the dirt and subsequently a packing and compacting action. Simultaneously, the smaller blades 53 on the rear hubs 51 impart a pulverizing action to the soil after it is broken up by the larger blades 44. Should it be desired to change this action, the frame 10 is inverted or turned over so that the blades and their supporting shafts 29 and 49, respectively, assume the position as shown in Figure 8, with the result that the tapered edges of the blades strike the soil flatly and then continue to penetrate, turn and break up the soil during the spiral path of the inclined blades 44. This soil is then further reduced or pulverized and packed by engagement of the smaller blades 53 carried by the rear shaft. Thus, it will be seen that as the harrow frame is reversible, the soil may be subjected to varied working operations at a minimum expenditure of time, effort and cost by discing, harrowing and compacting the soil simultaneously during the plowing operation for preparing the seed bedding or otherwise treating the soil.

It will be understood that the form of the invention shown is merely illustrative of a preferred embodiment and that such changes may be made as come within the scope of the following claims.

I claim:

1. An agricultural machine of the class described including an invertible frame having a front section and a rear section hinged to the front section, a transverse shaft connected to the sides of the front section, spaced hubs mounted on said shaft, each of said hubs having circumferentially spaced blades extending radially and outwardly therefrom, a transverse shaft connected to the sides of the rear section, spaced hubs mounted on the shaft of the rear section and having circumferentially spaced blades extending radially and outwardly therefrom, each of said blades having a leading edge and a trailing edge of shorter length than the leading edge and connected by a tapered edge to the front edge so that as the frame is moved over the ground the leading edge imparts a wedging and tearing action to the soil, said frame when inverted positioning the blades so that the tapered edges initially engage the soil flatly and as the blades penetrate they turn and break up the soil.

2. An invertible harrow as called for in claim 1, in which stop means are provided for limiting the swinging movement of the rear section relative to the front section of the frame.

3. A harrow including a frame having a front section and a rear section hinged to the front section, a horizontal shaft connected to the sides of the front section and disposed diagonally with respect to the horizontal transverse axis of said hinged sections, spaced hubs mounted on said shaft, each of said hubs having circumferentially spaced blades extending radially and outwardly therefrom, a horizontal shaft connected to the sides of the rear section and disposed diagonally with respect to the horizontal transverse axis of said hinged sections, spaced hubs mounted on the shaft of the rear section and having circumferentially spaced blades extending radially and outwardly therefrom, and means on each shaft for maintaining the hubs uniformly spaced thereon, the hubs and blades on the shaft of the front section being larger and spaced further apart than the hubs and blades on the shaft of the rear section so that the larger blades act initially to break up the soil and the smaller blades function to pulverize the soil previously broken up by the larger blades and then compress and pack the soil.

4. An invertible harrow including a frame having a front section having spaced side members and a rear section having side members hinged to the front side members, a horizontal shaft connected to the sides of the front section and disposed diagonally with respect to the horizontal transverse axis of said hinged sections, bearing tubing rotatably mounted on said shaft, transversely spaced hubs mounted on said tubing, means for non-rotatably connecting one of the hubs to said tubing, each of said hubs having circumferentially spaced blades extending radially and outwardly therefrom and disposed at an inclined angle relative to the hub axis, means on said tubing for maintaining the hubs in proper spaced position, a horizontal shaft connected to the sides of the rear section and disposed diagonally with respect to the horizontal transverse axis of said hinged sections, said shaft having a tubing rotatably mounted thereon, circumferentially spaced blades extending radially and outwardly from each of the hubs on the shaft on the rear section and disposed substantially at right angles to the hub axis, and spacer means between the hubs on the rear section shaft.

5. An invertible harrow as called for in claim 4, in which the blades and hubs on the front section are of larger diameter and spaced wider apart than the blades and hubs on the rear section, and means for limiting the swinging movement of the rear section of the frame relative to the front section.

6. An invertible harrow including a frame having a front section and a rear section hinged to the front section, means for limiting the swinging movement of the rear section relative to the front section of the frame, a horizontal shaft connected to the sides of the front section and disposed diagonally with respect to the horizontal transverse axis of said hinged sections, bearing tubing rotatably mounted on said shaft, transversely spaced hubs mounted on said tubing, means for non-rotatably connecting one of the hubs to said tubing, each of said hubs having circumferentially spaced blades extending radially and outwardly therefrom and disposed at an inclined angle relative to the hub axis, means on said tubing for maintaining the hubs in proper spaced position, a horizontal shaft connected to the sides of the rear section and disposed diagonally with respect to the horizontal transverse axis of said hinged sections, said shaft having a tubing rotatably mounted thereon, circumferentially spaced blades extending radially and outwardly from each of the hubs on the shaft on the rear section and disposed substantially at right angles to the hub axis, spacer means between the hubs on the rear section shaft, said blades having tapered pointed leading edges inclined downwardly and rearwardly so that as the frame is moved over the ground, the point of each blade engaging the soil initially imparts a wedging and tearing action and then a packing and compacting action, said blades when the frame is inverted causing the tapered edges of the blades to engage the soil flatly and penetrate, turn and break up the soil during its spiral path through the soil.

SAMUEL McCLENEGHAN, Jr.

REFERENCES CITED

The following references are of record in the file of this patent:

UNITED STATES PATENTS

| Number | Name | Date |
|---|---|---|
| 1,183,828 | Bjorkman | May 16, 1916 |
| 1,455,729 | Ingman | May 15, 1923 |
| 1,655,712 | Reynolds | Jan. 10, 1928 |
| 2,229,746 | Krause | Jan. 28, 1941 |

FOREIGN PATENTS

| Number | Country | Date |
|---|---|---|
| 17,397 | Denmark | May 28, 1913 |
| 34,433 | Sweden | Dec. 31, 1910 |
| 155,050 | Switzerland | Aug. 16, 1932 |